United States Patent

Koraichi et al.

(10) Patent No.: US 9,524,401 B2
(45) Date of Patent: Dec. 20, 2016

(54) METHOD FOR PROVIDING CONTROLLED ACCESS TO A MEMORY CARD AND MEMORY CARD

(75) Inventors: Najib Koraichi, Schimmert (NL); Sebastiaan Hoeksel, Maastricht (NL)

(73) Assignee: Vodafone Holding GMBH, Dusseldorf (DE)

(*) Notice: Subject to any disclaimer, the term of this patent is extended or adjusted under 35 U.S.C. 154(b) by 1690 days.

(21) Appl. No.: 12/577,320

(22) Filed: Oct. 12, 2009

(65) Prior Publication Data

US 2010/0095063 A1  Apr. 15, 2010

(30) Foreign Application Priority Data

Oct. 13, 2008 (EP) .................................. 08017900

(51) Int. Cl.
 *G06F 12/00* (2006.01)
 *G06F 21/79* (2013.01)
 *G06K 19/067* (2006.01)

(52) U.S. Cl.
 CPC ............. *G06F 21/79* (2013.01); *G06K 19/067* (2013.01); *G06F 2221/2151* (2013.01)

(58) Field of Classification Search
 CPC . G06F 21/79; G06F 19/067; G06F 2221/2151
 USPC ............ 711/103, 115, 152, 163; 726/17, 27; 386/252
 See application file for complete search history.

(56) References Cited

U.S. PATENT DOCUMENTS

| | | | | |
|---|---|---|---|---|
| 5,784,609 A | * | 7/1998 | Kurihara | |
| 5,784,704 A | * | 7/1998 | Sanemitsu | 711/164 |
| 2003/0155417 A1 | * | 8/2003 | Fairman | 235/381 |
| 2003/0217241 A1 | * | 11/2003 | Chong et al. | 711/163 |
| 2005/0027938 A1 | * | 2/2005 | Burkey | 711/114 |
| 2007/0201821 A1 | * | 8/2007 | Sato et al. | 386/83 |
| 2009/0257292 A1 | * | 10/2009 | Lee et al. | 365/189.15 |
| 2010/0030961 A9 | * | 2/2010 | Ma et al. | 711/115 |
| 2010/0090001 A1 | * | 4/2010 | Koraichi et al. | 235/382 |
| 2010/0115201 A1 | * | 5/2010 | Hsu | 711/115 |
| 2013/0262802 A1 | * | 10/2013 | Estakhri et al. | 711/162 |

FOREIGN PATENT DOCUMENTS

JP  WO 2005/039218 A1 * 4/2005 ............... H04Q 7/32

* cited by examiner

*Primary Examiner* — Reginald Bragdon
*Assistant Examiner* — Mehdi Namazi
(74) *Attorney, Agent, or Firm* — International IP Law Group, PLLC

(57) ABSTRACT

There is provided a method for providing access to data securely stored in memory card. An exemplary method comprises specifying first time information corresponding to a time period and storing the first time information in the memory card. The exemplary method also comprises inserting the memory card into a terminal. The exemplary method additionally comprises determining in a control unit included in the memory card, whether the time period has lapsed. The exemplary method also comprises allowing the terminal to access the data until it is determined that the time period has lapsed.

17 Claims, 1 Drawing Sheet

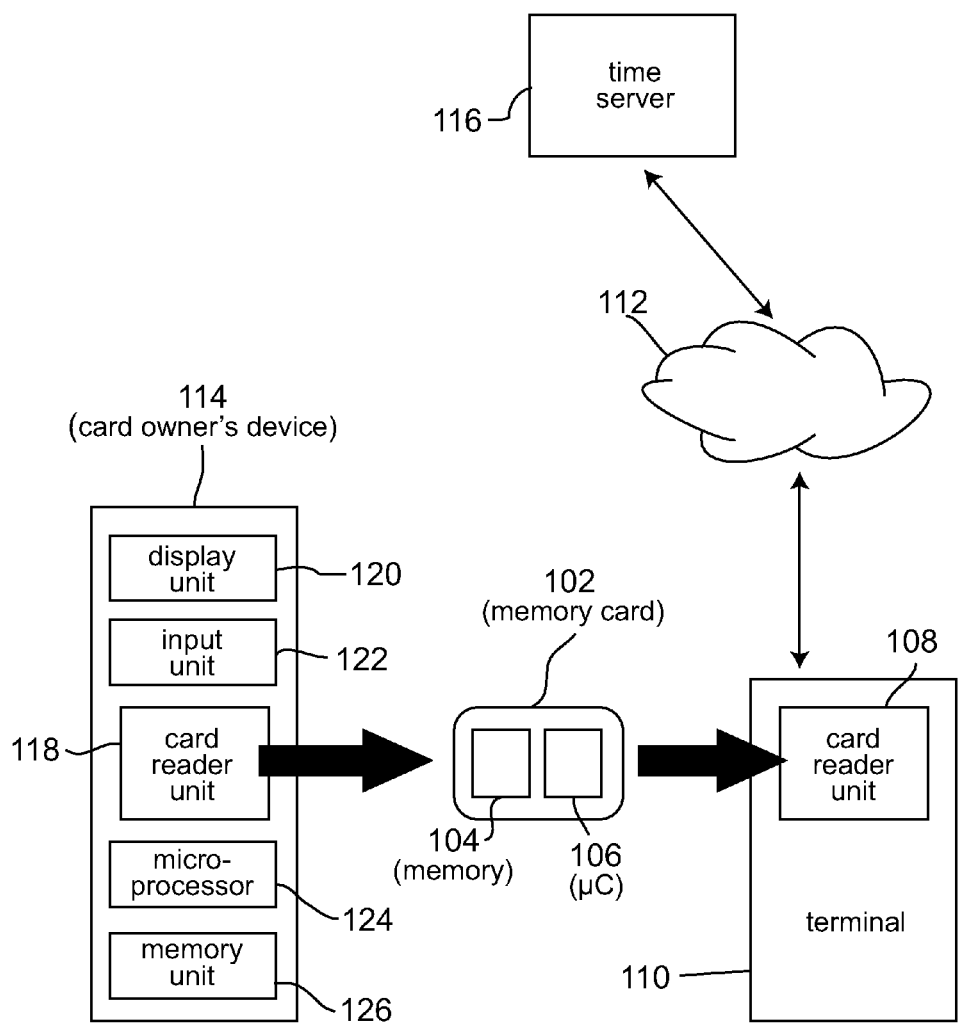

METHOD FOR PROVIDING CONTROLLED ACCESS TO A MEMORY CARD AND MEMORY CARD

CROSS REFERENCE TO RELATED APPLICATION

This application claims priority to European (EP) Patent Application No. 08017900.5, filed on Oct. 13, 2008, the contents of which are incorporated by reference as if set forth in their entirety herein.

BACKGROUND

Memory cards are integrated circuit (IC) cards including non-volatile memory and a controller, which controls the operation of the memory card. Such memory cards can be temporarily connected to host devices, such as, for example, personal computers (PCs), cellular telephones, personal digital assistants (PDAs), digital cameras, portable audio players and other host electronic devices for storage of data. A plurality of standards exists that specify different types of memory cards, such as, for example, SD (Secure Digital) cards, CF (Compact Flash) cards and MMCs (Multimedia Cards). A further example of a memory card, in the sense the term is used herein, is a USB (Universal Serial Bus) flash memory stick.

Memory cards of the type described before may provide a security mechanism for protecting data from unauthorized access. This allows for storing sensitive data in the memory card, such as, for example, banking details of the card owner, medical data of the card owner and personal photographs or other personal data.

The card owner may access the data using a credential, such as, for example, a password. However, the user may wish to make the protected data accessible for other persons in some situations. For instance, the card owner may wish to allow his doctor to read protected medical data stored in the memory card or to make personal photos available to a friend.

SUMMARY OF THE INVENTION

Exemplary embodiments of the present invention relate to memory cards with access protection. More specifically, exemplary embodiments of the invention are related to a method for verifying access to data securely stored on such a memory card. Moreover, exemplary embodiments of the invention are related to a memory card for securely storing data.

An exemplary embodiment of the invention may allow an owner of a memory card to make protected data stored in the memory card accessible to another person.

One exemplary embodiment of the present invention relates to a method for providing access to data securely stored in memory card. The method comprises the following steps:
 specifying first time information corresponding to a time period and storing the first time information in the memory card;
 inserting the memory card into a terminal;
 determining in a control unit included in the memory card, whether the time period has lapsed, and
 allowing the terminal to access the data until it is determined that the time period has lapsed.

A second exemplary embodiment of the present invention relates to a memory card for securely storing data therein. The memory card may be adapted to receive first time information corresponding to a time period and to store the first time information. The exemplary memory card also comprises a control unit configured to determine, whether the time period has lapsed, and to allow a terminal to access the data unless it is determined that the time period has lapsed, while the memory card is inserted in the terminal.

An exemplary embodiment of the present invention allows the card owner to specify first time information corresponding to a time period in which the protected data stored in the memory card can be accessed by a person using a terminal. The card owner may specify the first time information before handing over the memory card to the other person. By specifying first time information corresponding to a suitable short time period, unauthorized third parties may be prevented from accessing the protected data after the authorized person has accessed the data. Thus, access to the protected data can be limited to selected persons in secure way.

Furthermore, the access to the protected data can be allowed without having to provide a credential, such as, for example, a password. In particular, this makes access to the data easier for another person, since this person does not have to receive a credential for unlocking the memory card. Furthermore, a person may be prevented from accessing the protected data without the card owner's permission when he obtains the memory card a second time. If a credential was used for protecting the data, a person could use the credential he already received together with the card in the past when obtaining the memory card a second time.

In one exemplary embodiment of the method and the device, the terminal allows the control unit to connect to a clock unit arranged external to the memory card and to retrieve from the clock unit second time information specifying a current time, said second time information being used to determine, whether the time period has lapsed.

In this exemplary embodiment, the memory card does not have to include a clock unit so that the complexity of the memory card can be reduced.

In a further exemplary embodiment of the method and the device, the clock unit is comprised in a network server and the control unit connects to a network server via a network connection provided by the terminal to retrieve the second time information from the clock unit.

Retrieving the second time information from a network server may provide that confidential time information can be used, which are generated out of the sphere of influence of the person to which the memory card is handed over. This reduces the risk of fraudulent use of the memory card.

However, the second time information retrieved from the network server may be tampered with. For example, the second time information may be manipulated during their transmission to the memory card or a request of the time information may be redirected to another server in order to provide manipulated time information.

In order to prevent the second time information from being tampered with, one exemplary embodiment of the method and the memory card comprises that the time information retrieved from the clock unit comprises authentication information, particularly a digital signature, which is verified in the control unit.

In a further embodiment of the method and the device, the first time information specifies a point in time and the control unit determines, whether the time period has lapsed, based on a time difference between the specified point in time and the current time specified in the second time information.

In this exemplary embodiment, the card owner can advantageously specify a point in time, such as an absolute time, up to which the memory card can be accessed by another person using the terminal. This allows the card owner to control when the other person accesses the memory card. By specifying a near point in time, the card owner can prevent that an unauthorised person can access the memory card after the possession of the card devolved to him from the authorized person that received the card from the card owner.

In a related exemplary embodiment of the method and the device, the control unit repeatedly retrieves second time information form the clock unit while the memory card is inserted in the terminal and the control unit determines, whether the time period has lapsed, each time after second time information has been retrieved.

This allows the implementation of a relatively simple security mechanism in the memory card, in which the control unit repeatedly compares the retrieved current time with the point in time specified by the card owner without having to perform more complex calculations.

In an alternative embodiment of the method and the device, the control unit determines that the time period has lapsed when a time counter in the memory card indicates that the time difference has lapsed, said time counter being started after the memory card has been inserted into the terminal.

In such an exemplary embodiment, the second time information is retrieved only once. In particular, this reduces the number of accesses to the network time server so that the server load and the network load are reduced.

A further exemplary embodiment of the method and the device comprises that the first time information specifies the time period.

In such an embodiment, a defined time period is provided in which a person can access the memory card using the terminal irrespective of the point in time or absolute time when the person accesses the card. Thus, the person accessing the memory card is more flexible in choosing the point in time for accessing the card.

In an exemplary embodiment of the method and the device, the control unit determines that the time period has lapsed when a time counter in the memory card indicates that the time period has lapsed, said time counter being started after the memory card has been inserted into the terminal.

In an alternative embodiment of the method and the device, the control unit stores the time specified in the second time information when it retrieves the second information for the first time, the control unit repeatedly retrieves second time information from the clock unit, and the control unit determines, whether the time period has lapsed, based on a comparison of the time period and a time difference between the stored time and the current time specified in the lastly retrieved second time information.

In such an embodiment, the determination, whether the time period specified by the card owner has lapsed, is made based on the second time information retrieved from the confidential clock unit. Furthermore, a time counter that is implemented into the memory card may not be needed.

In another exemplary embodiment of the invention, a system is provided, the system comprising a memory card of the type described before and further comprising a terminal for receiving the memory card.

BRIEF DESCRIPTION OF THE DRAWINGS

Reference will be made by way of example to the accompanying drawings in which:

FIG. 1 is a block diagram of a system for controlling access to protected data stored in a memory card according to an exemplary embodiment of the present invention.

DETAILED DESCRIPTION OF SPECIFIC EMBODIMENTS

FIG. 1 schematically depicts elements of a system for controlling access to data stored in a memory card 102. In particular, the memory card 102 stores sensitive data of the card owner. In the system shown in FIG. 1, the owner can make such data accessible to authorized persons, while unauthorized third parties are prevented from accessing the data. In principle, the data may be any data the owner wants to share with selected persons. For instance, the data are medical data of the owner, which the owner wishes to share only with a doctor. Another example is banking details the owner wishes to provide only to trustworthy persons. In a yet further example, personal data are concerned, such as, for example, personal photos, the owner wants to share only with friends.

The memory card 102 comprises a memory 104 and a microcontroller 106 integrated into a housing. The housing may be small enough so that the owner can carry the memory card 102 easily and that the memory card 102 can also be used in connection with card readers, which are integrated into small devices, such as, for example, mobile communication devices. The memory card 102 may be configured according to a standard format and may be an SD card, a CF card, an MMC or the like. Another example of a memory card format in sense of this disclosure is a USB flash memory device. The standard format may particularly specify the size and shape of the memory card 102, the configuration of its electric contacts and the communication protocols used in the communication with the memory card 102. The standard compliance of the memory card 102 allows the card to be accessed using a card reader device, which is likewise compliant with the standard.

The memory 104 may comprise a non volatile storage that can be electrically erased and reprogrammed. Particularly, the memory 104 may be configured as a solid state storage unit, particularly a flash memory or a non-flash EEPROM (Electrically Erasable Programmable Read-Only Memory). However, the person skilled in the art understands that in principle any sort of memory device may be used. The memory 104 may be constituted by one or more memory chips, which are arranged in the housing of the memory card 102. The microcontroller 106 and the memory 104 may reside on one single chip within the memory card 102 or the microcontroller may be a separate chip connected to the memory 104.

The microcontroller 106 provides functionality for accessing the memory 104 using devices to which the memory card 102 is connected. In particular, the microcontroller 106 implements the communication protocols used for the data exchange between the memory card 102 and a connected device.

At least the part of the data content of the memory 104 comprising the sensitive data of the owner is protected against unauthorized access, i.e. the unauthorized reading, deleting and manipulating of the protected data. For protecting the data, the microcontroller 106 provides a control unit controlling the data storage to and data retrieval from the memory 104. Each attempt to access the protected data stored in the memory 104 is either allowed or denied by the control unit. The control unit may be implemented as a software program, which is run on the microcontroller 106 of the memory card 102.

In addition to the protected data, there may be stored in memory card 102 further data, which are not particularly secured. Regarding the protected data, a group management may optionally be provided. This means that different groups of protected data are stored in the memory card 102, where different access authorizations can be configured for the groups. The groups may be stored in different areas of the memory 104 or the data files contained in the different groups may be identified in another way. The groups are managed in the control unit. The group management allows for storing in the same memory card 102 data the owner wants to share with different people. For instance, the owner can store health data for sharing with his or her doctor and data for sharing with friends on the same memory card 102.

For accessing the protected data stored in the memory card 102, a card reader unit 108 is used, which is coupled to a terminal 110 of the person who wants to access the protected data. The card reader unit 108 may be integrated into the terminal 110 as it is depicted in FIG. 1, or the card reader unit 108 may be a separate unit connected to the terminal 110. Through a suitable interface, the terminal 110 is connected to a communication network 112, which connects the terminal 110 to a time server 116. In an exemplary embodiment of the present invention, the communication network 112 comprises the Internet. However, the communication network 112 may also be configured as another network allowing a data exchange between the terminal 110 and the time server 116, such as, for example, a mobile communication network. Moreover, there may be other networks, not shown in FIG. 1, which connect the terminal 110 to the communication network 112. If the communication network 112 is the Internet, the terminal 110 can be connected thereto via a mobile communication network, for instance. The terminal 110 may be a personal computer or another stationary device, including a dedicated stationary terminal. Likewise, it is possible that the terminal 110 is configured as a handheld device, which may be a dedicated device or a general purpose device, such as, for example, a mobile communication device.

The time server 116 includes a clock unit, which measures the current absolute time. The clock unit may provide a high accuracy with only small deviations from the correct time. Furthermore, the time server 116 may be protected from being tampered by suitable precautions.

The owner of the memory card 102 also disposes of a device 114 comprising a card reader unit 118 for receiving the memory card 102. The device 114 is utilised for preparing the memory card 102 before it can be accessed using the terminal 110. Therefore, the device 114 may comprise a portable device, which can be carried by the user easily. For allowing the card owner to operate the device 114, it comprises a display unit 120, such as, for example, a monitor, and an input unit 122, such as, for example, a keypad. The operation of the device 114 is controlled using a microprocessor 124. The microprocessor 124 is coupled to the card reader unit 118, the display unit 120 and the input unit 122. Furthermore, the microprocessor 124 is coupled to a memory unit 126 for storing software programs that are executed in the microprocessor 124 and for storing further data used in the operation of the device 114. The device 114 may be a device dedicated to the functions described herein. However, a device 114, which the card owner usually already carries so that he does not have to carry a further device, may be used. An example of a device 114, which can be utilized within the scope of an exemplary embodiment of the invention and which is already carried by the card owner is a mobile communication device, such as, for example, a cellular phone, a PDA or the like.

When the owner of the memory card 102 wishes to make his protected data accessible to the user of the terminal 110, he inserts the memory card 102 into the card reader unit 118 of his device 114. The device 114 provides a function which allows the user to specify a point in time up to which the protected data stored in the memory card 102 is to be made accessible. As an alternative, the card owner may specify a time period during which the protected data stored in the memory card 102 is to be made accessible. With this alternative, the point in time up to which the protected data is accessible is calculated from the specified time period using the current time, which is available in the device 114. It should be noted that the time period the card owner specifies calculates starting at the time when it is entered into the device 114.

In one exemplary embodiment, the function for specifying the point in time is implemented in the form of software application which is executed in the microprocessor of the device 114. The user may specify the point in time or the time period using the input unit 122 and the application may provide a graphical user interface at the display unit 120 to allow for an easy and convenient operation. In another exemplary embodiment, the function is provided by the memory card 102 itself. Here, the memory card 102 may comprise a web server enabling the memory card 102 to provide web pages which can be accessed using a web browser. For implementing the web server into the memory card 102, the so-called smartcard web server (SCWS) technology may be used. This technology, which allows for integrating web servers into smartcards, can be adapted to the memory card 102, which is a particular smartcard. The communication between the memory card 102 and the device 114 may use one of the two bearers offered by the SWCS technology, i.e. the T=0 protocol with a BIP (Bearer Independent Protocol) interface layer or the TCP/IP (Transmission Control Protocol/Internet Protocol) using a USB interface, where the recently standardized USB interface smart cards is particularly described in ISO 7816-12. For allowing the card owner to specify the point in time up to which the memory card 102 is accessible, the web server of the memory card 102 may provide a web page which is accessed using a browser software of the device 114. The web page may be displayed at the display unit 120 and the user may input the point in time or the time period till the point in time using the input unit 122 of the device 114. If the user specifies a time period, the control unit may calculate the point in time based on the current time, which may be provided by the clock of the device 114.

The card owner may start the procedure of specifying the point in time or the time period by starting the corresponding software application. This may be done when the card owner intends to hand the memory card 102 over for reading the data in the near future and when he knows how much time the acceptor needs to read the protected data. Typically, the user may specify the point in time or the time period at the acceptor's site directly before he hands over the memory card 102 to the acceptor. Thus, it may be advantageous that the device 114 is portable.

After the card owner has specified the point in time or the point in time has been calculated from the time period specified by the card owner, the control unit checks the authorization of the card owner. For this purpose, the device 114 forwards a credential to the memory card 102. Then, the control unit verifies the credential. The credential may include a user name and/or a secret password or a PIN (Personal Identification Number). The credential may be passed to the control unit of the memory card 102 together with the point in time or time period. The credential is entered by the card owner, or the credential is securely stored in the device 114 and forwarded to the memory card 102 together with the point in time or time period. If the credential cannot be verified successfully, the control unit does not allow the point in time to be stored in the memory card 102. After having successfully verified the credential, the point in time specified by the card owner or calculated from a time period specified by the card owner, the control unit securely stores the point in time in the memory card 102.

In order to allow the card owner to access the protected data without setting a time limit, it may be provided that the control unit also allows access to the protected data based on a successful verification of the credential.

After the point in time or time period has been stored in the memory card 102, the card owner hands over the memory card 102 to the acceptor. The card owner may be informed about the successful storage of the point in time by presenting a corresponding message, which is generated in the control unit, at the display unit 120 of his device 114. After the receipt of the memory card 102, the acceptor inserts the memory card 102 into the card reader unit 108 of the terminal 110.

Before the control unit allows the terminal 110 to access the protected data stored in the memory 104 of the memory card 102, the control unit retrieves time information from the time server 116. Information for establishing a connection to the time server 116, such as the network address of the time server 116, is securely stored in the memory card 102. The data exchange between the control unit and the time server 116 may be based on the HTTP (Hypertext Transfer Protocol). In one exemplary embodiment, a "continuous" connection between the memory card 102 and the time server 116 may be established via the terminal 110 using the HTTP. This means, that a protocol conversion of the control unit's request for providing time information and of the answer of the time server 116 may not be needed.

The time information provided by the time server 116 specifies the current time as measured in the time server 116. Furthermore, the time information is cryptographically secured in such a way that a recipient can verify that the time information originates from the time server 116 and that the time information was not modified during transmission to the recipient. In order to achieve this, the time information is encrypted using a secret encryption key of the time server 116. As an alternative, the time information includes a digital signature of the time server 116, such as a check value, which is derived from the content of the information and encrypted using the secret key of the time server 116. The secret encryption key is part of an asymmetric key pair further including a public decryption key for decrypting data, which has been encrypted using the secret encryption key. The public decryption key of the time server 116 is securely stored in the memory card 102. The secure storage prevents the key from being replaced by another key. As an alternative to the utilisation of asymmetric key pair, it is likewise possible to utilise symmetric encryption with one key for encryption and decryption that is shared between the time server 116 and memory card 102.

When the memory card 102 receives the time information, the control unit verifies the authenticity of the time information. For this purpose, the control unit decrypts the time information or the digital signature with the public encryption key thereby verifying the authenticity and integrity of the time information. If a digital signature is used, the control unit decrypts the check value thereby confirming that the time information originates from the time server 116. Then, the time control unit compares the check value to a self-generated check value and determines that the time information is unaltered, if both check values match.

In a further exemplary embodiment, the memory card 102 may place a digital signature of the memory card 102 into requests transmitted to the time server 116, which may be returned together with the time information. The digital signature may be generated using a secret key allocated to the memory card 102, and when receiving the time information, the memory card may verify the digital signature using the secret key or a decryption key allocated to the secret key. When the digital signature is successfully verified, it is ensured that the time information originates from the time server, to which the request has been sent. The verification of the digital signature may be part of the verification of the authenticity of the time information.

If the authenticity of the time information cannot be verified successfully, the control unit denies access to the protected data stored in the memory card 102. After the authenticity and integrity of the time information has been validated successfully, the control unit compares the time information with the point in time that was specified by the card owner and that is stored in the memory card 102. If this point in time follows the point in time specified in the time information received from the time server 116, the control unit allows accessing the protected data stored in the memory card 102 using the terminal 110.

After the control unit has allowed access to the protected data, it determines when the point in time specified by the card owner is reached. If it is determined that the point in time is reached, the control unit locks the protected data again, for example, by preventing any further access to the data. The protected data are being locked even when the memory card 102 is still inserted into the card reader 108 of the terminal 110.

In order to determine when the stored point in time is reached, the control unit may repeatedly retrieve time information. In particular, the control unit may retrieve the time information in regular, predetermined time intervals, which are not too long so that the user of the terminal 110 does not have access to the protected information significantly later than the stored point in time. Each time the control unit retrieves time information from the time server 116, it compares the time specified in the time information with the stored point in time and unlocks the protected data when the stored point in time is no longer in the future relative to the current time as specified in the time information retrieved from the time server 116. The control unit may also lock the protected data, if the time information received from the time server 116 cannot be verified successfully. In addition, the control unit may also lock the protected data, if time information cannot be retrieved from the time server 116, since in this case, the control unit may not be able to determine, whether the point of time specified by the card owner has been reached.

In a further exemplary embodiment, the control unit only retrieves time information from the time server 116 once, after the memory card 102 has been inserted into the terminal 110, and calculates a difference between the time indicated by the time server 116 and the point in time specified by the card owner. Then, the control unit starts a time counter. When a counter value corresponding to the calculated time difference has been reached, the control unit determines that the time period corresponding to the calculated difference is lapsed and locks the protected data again against access from outside the memory card 102.

Time information provided by the time server 116 and received in the memory card 102 may be stored in the memory card 102. Every time the control unit receives new time information from the time server 116 it checks whether the new time information specify a later time than the time information received before. If this is not the case, manipulated time information has been received and the protected data is locked. This procedure is particularly useful, if the control unit repeatedly retrieves time information from the time server 116 in order to determine whether the protected data is to be locked again. However, it can also be provided that the control unit compares the time information of one access interval with the time information retrieved in the following access interval in order to detect fraud, which is also possible when the control unit retrieves time information only for one time during an access interval. Here, the term access interval refers to one contiguous time interval, in which access to the protected data is allowed and which is initiated by specifying a point in time up to which the protected data is accessible.

Further exemplary embodiments of the invention differ from the exemplary embodiments described before in that the card owner specifies a time period for accessing the memory card 102 instead of or in addition to an absolute point in time up to which the memory card 102 can be accessed. Here, the control unit stores the time information it retrieves from the time server 116 when the memory card 102 has been inserted into the terminal 110. While the memory card 102 is inserted into the terminal 110, the control unit may again repeatedly retrieve time information from the time server 116. Each time the control unit retrieves time information from the time server 116, it compares the time specified in the time information with the stored time and locks the protected data again when the difference between these times exceeds the time period specified by the user. In other respects, the security mechanism may be the same as in the exemplary embodiments described before. In particular, the control unit may lock the memory 104, if no time information can be retrieved from the time server 116, if the retrieved time information cannot be authenticated successfully and if time information received from the time server 116 specifies an earlier or the same time than time information received before.

In a yet further exemplary embodiment, in which the user specifies a time period for accessing the memory card 102 instead of or in addition to an absolute point in time up to which the memory card 102 can be accessed, the control unit utilises a time counter of the memory card 102 for determining, whether the time period has lapsed. The time counter is started, after the memory card 102 has been inserted into the terminal 110. When a counter value corresponding to the specified time period has been reached, the control unit determines that the time period has lapsed and locks the protected data again against access from outside the memory card 102.

If the time period is specified in addition to an absolute point in time up to which the memory card 102 can be accessed, the control unit locks the protected data if the point in time has been reached or if the time period has lapsed depending on which event occurs first. This means, that the protected is locked, when the point in time is reached even in case the time period has not lapsed yet. Furthermore, the protected data is locked, when the time period has lapsed, if the specified point in time has not been reached yet.

As described before, the memory card 102 may provide a group management. If the card owner wants to make only one or more selected groups of protected data accessible, he may specify such groups together with the point in time up to which the data is made accessible or together with the time period for accessing the data. The specified groups are memorized in the control unit and the control unit does not allow access to other groups of protected data when the memory card 102 is inserted into the card reader unit 108 of the terminal 110.

Furthermore, in addition to the security mechanisms described before, a further security mechanism may be provided for protecting the data in the memory card 102. For instance, allowing access to the protected data may additionally require that a password or other credential is entered into the terminal 110 and is verified by the control unit. The password or credential may be provided to the user of the terminal 110 by the card owner. In this context, the time limit for accessing the data prevents that he user of the terminal 110 access the data to a greater extent than intended by the card owner. Particularly, the user of the terminal 110 cannot access the protected data without the card owners permission when he obtains the memory card 102 a second time after having received the credential together with the memory card 102 before.

While the invention has been illustrated and described in detail in the drawings and foregoing description, such illustration and description are to be considered illustrative or exemplary and not restrictive; the invention is not limited to the disclosed exemplary embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage.

Any reference signs in the claims should not be construed as limiting the scope.

What is claimed is:

1. A method for providing access to data securely stored in a memory card, the method comprising:
    specifying first time information corresponding to a time period and storing the first time information in the memory card;
    inserting the memory card into a terminal;
    determining in a control unit included in the memory card, whether the time period has lapsed; and
    allowing the terminal to access the data until it is determined that the time period has lapsed, wherein the terminal allows the control unit to connect to a clock unit arranged external to the memory card and to retrieve from the clock unit second time information specifying a current time, the second time information being used to determine whether the time period has lapsed.

2. The method according to claim 1, wherein the clock unit is comprised in a network server and wherein the control unit connects to a network server via a network connection provided by the terminal to retrieve the second time information from the clock unit.

3. The method according to claim 1, wherein the time information retrieved from the clock unit comprises authentication information, particularly a digital signature, which is verified in the control unit.

4. The method according to claim 1, wherein the first time information specifies a point in time and wherein the control unit determines, whether the time period has lapsed, based on a time difference between the specified point in time and the current time specified in the second time information.

5. The method according claim 4, wherein the control unit repeatedly retrieves second time information from the clock unit while the memory card is inserted in the terminal and wherein the control unit determines, whether the time period has lapsed, each time after second time information has been retrieved.

6. The method according to claim 4, wherein the control unit determines, that the time period has lapsed when a time counter in the memory card indicates that the time difference has lapsed, the counter being started after the memory card has been inserted into the terminal.

7. The method according to claim 1, wherein the first time information specifies the time period.

8. The method according to claim 7, wherein the control unit determines that the time period has lapsed when a time counter in the memory card indicates that the time period has lapsed, the counter being started after the memory card has been inserted into the terminal.

9. The method according to claim 7, wherein the control unit stores the time specified in the second time information when it retrieves the second information for the first time, wherein the control unit repeatedly retrieves second time information from the clock unit, and wherein the control unit determines, whether the time period has lapsed, based on a comparison of the time period and a time difference between the stored time and the current time specified in the lastly retrieved second time information.

10. A memory card for securely storing data therein, wherein the memory card is adapted to receive first time information corresponding to a time period and to store the first time information, and wherein the memory card comprises a control unit configured to determine, whether the time period has lapsed, and to allow a terminal to access the data until it is determined that the time period has lapsed, while the memory card is inserted in the terminal, wherein the control unit is adapted to connect to a clock unit arranged external to the memory card, while the memory card is inserted in the terminal, and to retrieve from the clock unit second time information specifying a current time, said second time information being used to determine whether the time period has lapsed.

11. A system, comprising:
a terminal for receiving a memory card; and
a memory card for securely storing data therein, wherein the memory card is adapted to receive first time information corresponding to a time period and to store the first time information, and wherein the memory card comprises a control unit configured to determine, whether the time period has lapsed, and to allow the terminal to access the data until it is determined that the time period has lapsed, while the memory card is inserted in the terminal, wherein the terminal allows the control unit to connect to a clock unit arranged external to the memory card and to retrieve from the clock unit second time information specifying a current time, the second time information being used to determine whether the time period has lapsed.

12. The system according to claim 11, wherein the clock unit is comprised in a network server and wherein the control unit connects to a network server via a network connection provided by the terminal to retrieve the second time information from the clock unit.

13. The system according to claim 11, wherein the time information retrieved from the clock unit comprises authentication information, particularly a digital signature, which is verified in the control unit.

14. The system according to claim 11, wherein the first time information specifies a point in time and wherein the control unit determines, whether the time period has lapsed, based on a time difference between the specified point in time and the current time specified in the second time information.

15. The system according claim 14, wherein the control unit repeatedly retrieves second time information from the clock unit while the memory card is inserted in the terminal and wherein the control unit determines, whether the time period has lapsed, each time after second time information has been retrieved.

16. The system according to claim 14, wherein the control unit determines, that the time period has lapsed when a time counter in the memory card indicates that the time difference has lapsed, the counter being started after the memory card has been inserted into the terminal.

17. The system according to claim 11, wherein the first time information specifies the time period.

* * * * *